United States Patent [19]
Dorsey, Jr.

[11] 3,910,080
[45] Oct. 7, 1975

[54] BICYCLE HITCH LOCK
[76] Inventor: Harold Dorsey, Jr., 911 Elmwood St., Evanston, Ill. 60202
[22] Filed: May 30, 1974
[21] Appl. No.: 474,513

[52] U.S. Cl. ............................................... 70/234
[51] Int. Cl.² ....................................... A47B 49/00
[58] Field of Search .................. 70/234; 15/230.11; 339/273, 247, 252 P

[56] References Cited
UNITED STATES PATENTS
2,749,599   6/1956   Kreger ...................... 15/230.11 X
2,982,010   5/1961   Johns ........................ 15/230.11 X
3,827,773   8/1974   Aiello ........................... 70/234 X FOREIGN PATENTS OR APPLICATIONS
924,278   2/1955   Germany ....................... 339/252 P

*Primary Examiner*—Richard E. Moore
*Attorney, Agent, or Firm*—Watson D. Harbaugh

[57] ABSTRACT

A lock assembly rotatably mounted on a capped post a spaced distance above the ground with horizontally swinging loops terminally interlocked to the post with spaced mounting rings supporting the loops for rotation.

8 Claims, 6 Drawing Figures

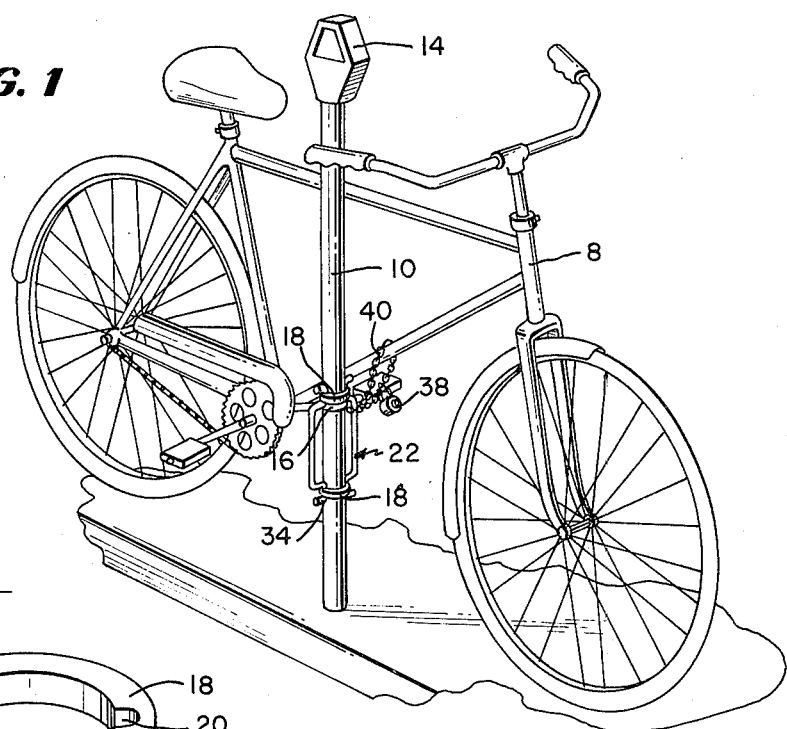
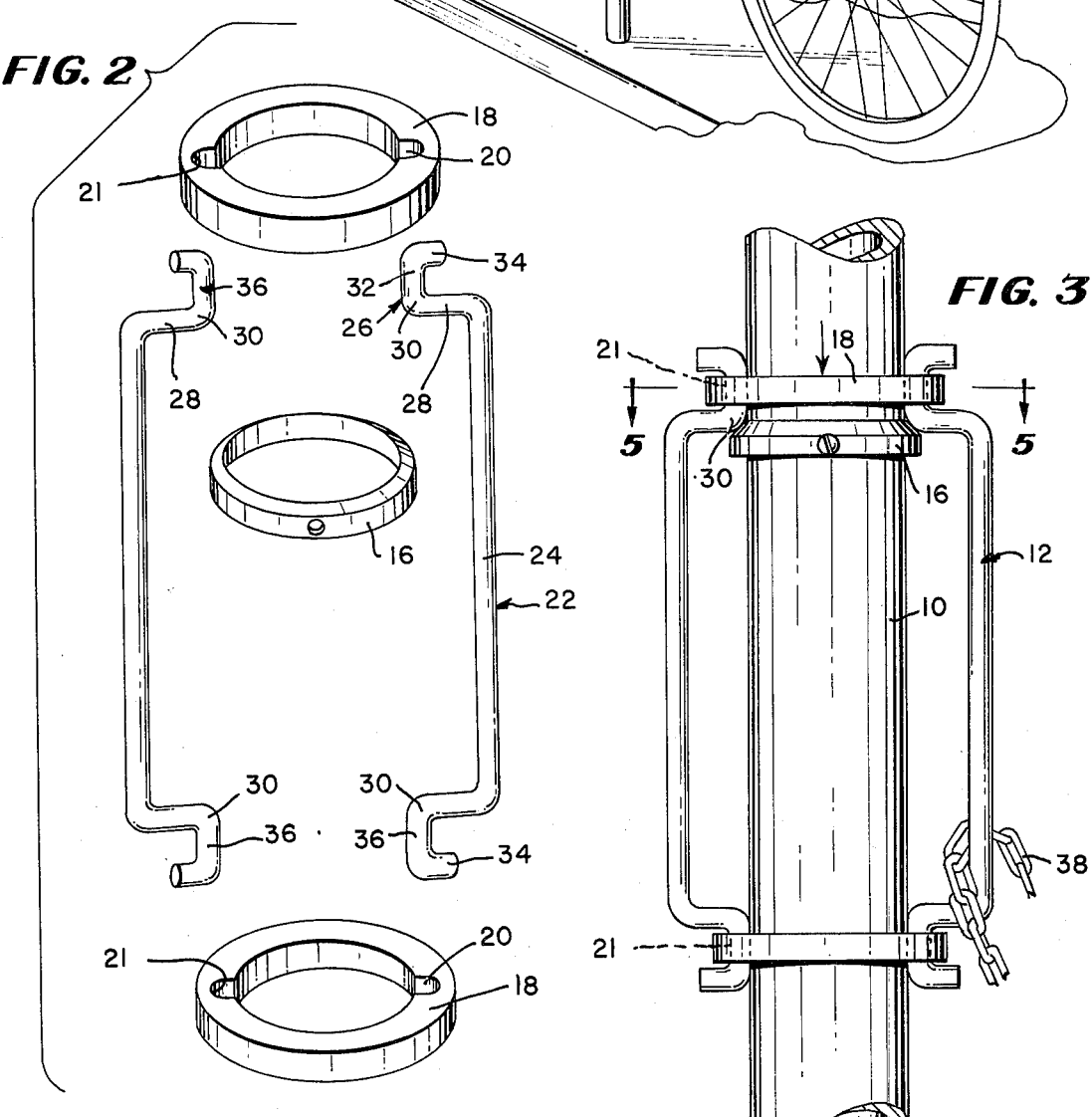
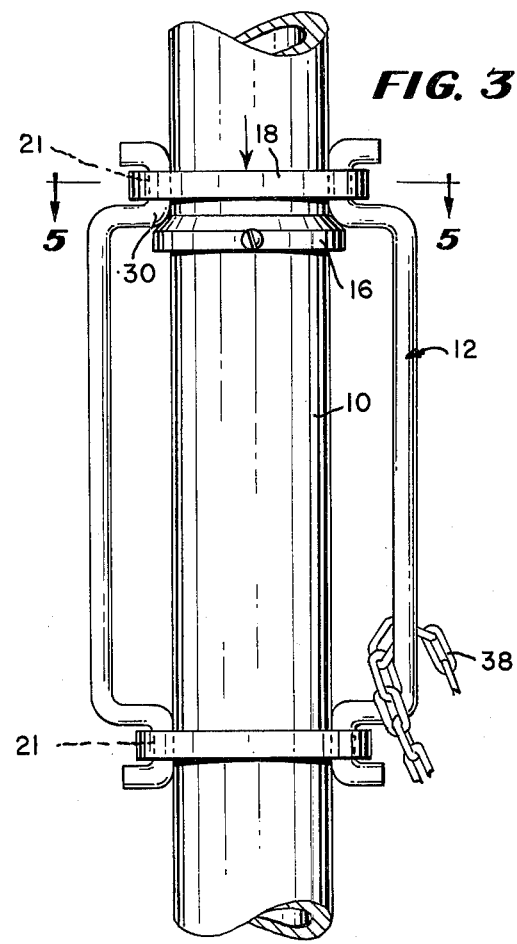

BICYCLE HITCH LOCK

BACKGROUND OF INVENTION

Assuming an anti-theft key lock and chain device for bicycles that is reasonably burglar proof, securements for them are provided which are sufficiently rigid that a heavy blow or pry bar can break the hitch and free a bicycle without destruction of lock or chain. Although such still may not permit the bicycle to be ridden, the bicycle can be carried away and the chain and lock released in hiding.

SUMMARY OF INVENTION

Regarding the present invention, it may be noted that bicycles are generally parked where the greatest number of parking meters happen to be located as generally supported on vertical posts at the sides of a street. These posts are rugged and are generally set far enough back from the curb of the street to accommodate two bicycles parallel to the curb located on opposite sides of each post and leaning against them.

With most bicycle locks all that is ultimately intended is to prevent a riding away of the bicycle by a thief and although many impulsive juveniles may be discouraged, professional thieves are inhibited but very little. Detection and apprehension of a thief is greatest when a bicycle frame is locked to something that cannot be broken and a great many hammer blows must be struck to release the bicycle. Most hitches are rigid and can be broken by only a few muffled heavy blows against a rigid securement member.

Ease of installation and the desirability of making a thief commit other crimes to accomplish the theft of a bicycle are also attractive objects of the invention as well as making it difficult to damage the non-rigid hitch elements.

DESCRIPTION OF THE DRAWINGS

FIG. 1 is a perspective view of the invention by which a bicycle is hitched and locked to a parking meter post;

FIG. 2 is an exploded view of the parts used in the preferred embodiment of the hitch shown in FIG. 1;

FIG. 3 is an enlarged side elevation of the hitch illustrated in FIG. 1;

PREFERRED EMBODIMENT

Figure 5:
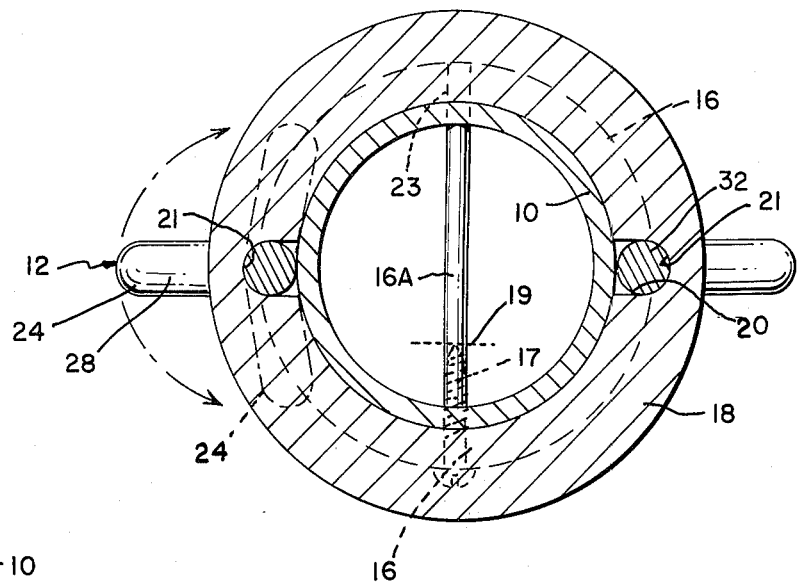
FIG. 5 is a sectional view taken on line 5—5 in FIG. 3.
Figure 4:
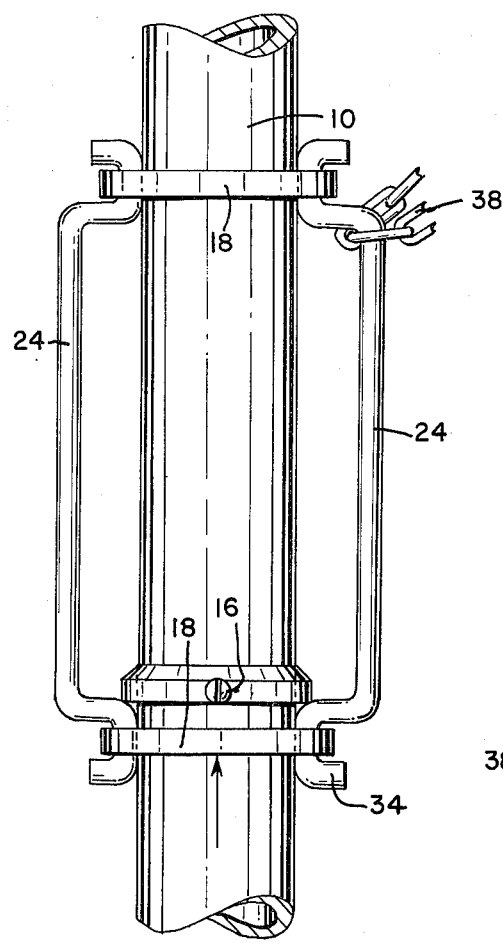
FIG. 4 is a view similar to FIG. 3 illustrating the vertical range of the hitch upon the meter post for operation at different heights.

As will be noted in the drawing a parking meter support post 10 is employed upon which the present hitch 12 is mounted with the parking meter 14 having a larger size than the post and secured in place at the top of thereof. The hitch 12 is installed before final installation of the meter 14.

The hitch 12 includes a set screw member 16, two spaced collars 18 each with one or two inside U-shaped recesses 20 on their inner face that are closed against the post 10 to form journals 21. Formed members such as yoke shaped rods 22 generally define a captive U-shaped bail or central portion 24 having the parallel free ends 26 bent parallel to form legs as at 28 and then away from each other at 30 to provide journal shafts 32. The terminal ends are bent back parallel to the legs 28 to provide crook ends 34. Thereby, the ends form U-shaped hooks which engage in the journals 21 and extend around the recesses 20 of the collars 18 as the collars are slipped into place on the post 10. The set screw member 16 is located below one of the collars 18 where it is locked at a predetermined height on the post convenient for access to a bicycle owner without stooping. The parking meter 14 is then installed, or reinstalled, to prevent removal of the hitch 12 without trouble and with a commission of a crime involving parking meters.

The U-shaped portions 24 are parallel with each other and the post and are each free to pivot on their journal shafts 32 through an arc greater than 180°. Moreover, the collars 18 are capable of rotating bodily around the post for optimized convenience of the bicycle owner parking his bicycle. Thus, the entire assembly can easily be rotated around the post for selection of one or both rotatable loops for the convenience of bicycle owners through which even the lock 38 can be threaded with loops of steel wire or chain 40 wrapped around the bicycle frame at a convenient height with the additional advantage of supporting the bicycle erectly against falling.

Figure 6:
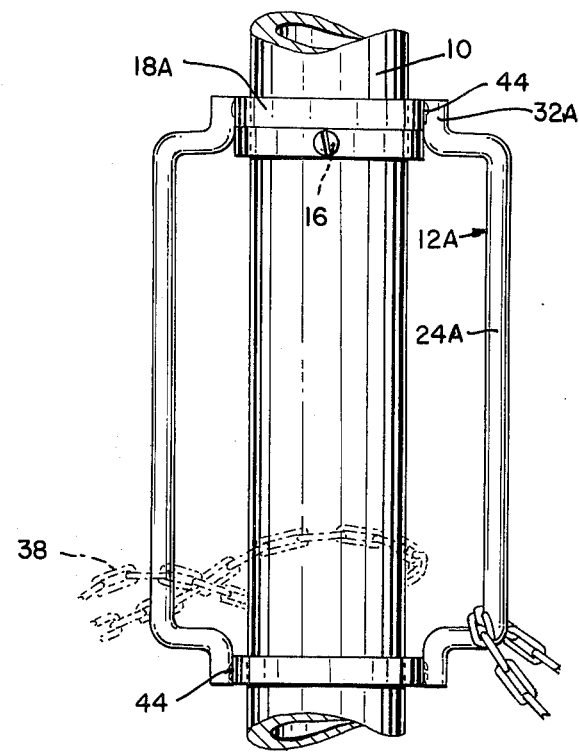
FIG. 6 is a side elevational view of a modification of the hitch illustrated in FIG. 3.

Referring to FIG. 6 a modification is illustrated by hitch 12A in which the bails 24A are of simplified form with the stub shafts 32A welded as at 44 to the collars 18A. In both embodiments the geometry of the loops will not permit straight pry bars being extended through both loops simultaneously.

Although the set screw member 16 in both embodiments may employ a set screw 17, per se, to avoid drilling the posts, a screw or bolt 16A is illustrated in FIG. 5 which can pass through one side of the post wall where it may terminate as indicated in broken line 19, or be long enough to extend through the other side also as indicated at 23. If the bolt 16A extends diametrically beyond both sides of the post 10 the circular member 16, per se, can be dispensed with since the bolt ends would serve as a level set screw member.

Also as represented in FIG. 6 the chain 38 can be double secured if desired, it being insertable through one side of a bail 24, then around the post 10 and out through the other side of the bail 24.

Assuming that the lock 38 and chain 40 thwart attempts to release the bicycle and a heavy hammer or pry bar is used in an endeavor to free one of the rods 22, it will be difficult to use a hammer without damaging the bicycle. This discourages the thief on his expected gain. Moreover, when the rods 22 are struck they are free to rotate rather than absorb the full effect of the hammer blows. Either the bail 24 swings away of the whole hitch assembly rotates partially to minimize the hammer blow impacts, or, both may occur.

Under these circumstances like a willow tree yielding in the wind when an oak tree would break, the assembly requires that so many blows be made that they themselves would sound a compelling alarm particularly since the hitch is made up of comparatively loose metal parts striking each other as hammer blows are deflected or shed. Even the use of tension and bending bars would not release the loops without substantial noise, nor could the loops if brought into close proximity to eacn other for the use of a straight bar. The post could not be used as a fulcrum. Also the hooks 36 at the end of the bails would not be easily twisted or pulled free about a horizontal axis as supported in the notches against the post. Furthermore, the hook ends 34 would not straighten for release from their journals if a jack were employed.

Accordingly, the more difficult the task is to steal the more sophisticated the tools have to be. Their use or possession would warrant suspicion before or after an overt act.

Moreover, it has been found that a series of these assemblies can be used to rope off a curb upon occasions when desired even if bicycles are parked and locked. They can also serve as loop hitches for leashes of pets in which knots must be untied as distinguished from being slipped off the end of a hook in order to be released.

Much of the strength of the metal will be in the work hardening of the ends of the swinging bails and although square notches and square bails can be used which hold the bails in squared orientations, freedom to pivot is desired for the safety reasons stated.

What is claimed is:

1. A hitch for bicycles comprising a post;
   means secured adjacent to the top of the post having a diametrical dimension greater than that of the post;
   a pair of axially spaced collars of lesser diametrical dimension slipped on the post and rotatably encircling the post below said means, said means obstructing removal of said collars from the post;
   an axially adjustable member secured to the post for supporting one of the collars at selected heights to set the limits of the vertical range of operational movement of said collars on the post; and
   a formed element having a main portion bowed outward between two terminal portions and terminally secured to said collars to support the other collar in spaced relation from said one collar to form in combination with the post a closed loop that is pivotable about the post.

2. The hitch defined in claim 1 in which said terminal portions are welded to said collars for handling and rotation as a unit around the post.

3. The hitch defined in claim 1 in which said terminal portions are journalled in coaxial openings on said collars for relative rotation around the post and with respect to said collars.

4. A hitch for bicycles comprising a post secured in place;
   means secured adjacent to the top of the post having a diametrical dimension greater than that of the post;
   collar means of a lesser diametrical dimension rotatably encircling and slipping along the post below said means and defining at least one journal opening whose axis is disposed in a direction substantially parallel with the post, said secured means obstructing removal of said collar means from the post;
   a member secured to the post supporting the collar means at a selected height on the post determining the vertical range of movement of said collar means on the post; and
   a formed element having a captive portion journalled in said journal opening and defining a closed configuration for receiving a flexible locking device therethrough.

5. A post hitch comprising two axially spaced collars receivable on a post and defining aligned internal recess journals;
   means for supporting one of said collars at a selected position on the post; and
   at least one formed member centrally having a main loop bowed in one direction between two terminal hook portions that are bent in the opposite direction, said hook portions being journalled in said recess journals to be supported by and held by said collars in spaced relation for them to slip along the post a distance related to the spacing of said hook portions.

6. The hitch defined in claim 5 including set screw means for engaging the post to support at least one collar at a predetermined elevation at one limit of said vertical movement.

7. A post hitch comprising two axially spaced collars receivable on a post each having identically circumferentially spaced internal recesses defining journals; and
   a pair of bails each centrally having a main loop bowed in one direction with parallel ends and two terminal loops bowed in the opposite direction with parallel sides and journalled in the respective spaced journals for horizontal pivoting throughout 180° and hold said rings in spaced relation.

8. The hitch for bicycles defined in claim 1 in which said means secured adjacent to the top of the post comprises a parking meter installed in operative position.

* * * * *